US007721773B2

(12) United States Patent
Stadlmayr et al.

(10) Patent No.: US 7,721,773 B2
(45) Date of Patent: May 25, 2010

(54) METHOD AND DEVICE FOR THE PRODUCTION AND BOTTLING OF LIQUIDS ENRICHED WITH OXYGEN

(75) Inventors: Thomas Stadlmayr, Traunstein (DE); Manfred Ziegler, Ruderting (DE)

(73) Assignees: Adelholzener Alpenquellen GmbH, Siegsdorf (DE); Krones Aktiengesellschaft, Neutraubling (DE)

(*) Notice: Subject to any disclaimer, the term of this patent is extended or adjusted under 35 U.S.C. 154(b) by 1105 days.

(21) Appl. No.: 10/572,356

(22) PCT Filed: Sep. 16, 2004

(86) PCT No.: PCT/EP2004/010407

§ 371 (c)(1),
(2), (4) Date: Mar. 16, 2006

(87) PCT Pub. No.: WO2005/029982

PCT Pub. Date: Apr. 7, 2005

(65) Prior Publication Data

US 2007/0062160 A1    Mar. 22, 2007

(30) Foreign Application Priority Data

Sep. 18, 2003   (DE) .............................. 103 43 281

(51) Int. Cl.
  *B65B 1/04* (2006.01)
(52) U.S. Cl. .............. 141/302; 141/7; 141/48; 141/57; 141/64; 222/386.5
(58) Field of Classification Search .............. 52/510, 52/432, 403; 222/386.5; 141/6, 7, 37, 48, 141/59, 63, 64, 57, 285, 301, 302
  See application file for complete search history.

(56) References Cited

U.S. PATENT DOCUMENTS

| 4,120,425 A | * | 10/1978 | Bethurum ................ 222/146.6 |
| 5,131,440 A | * | 7/1992 | Quinn ....................... 141/63 |
| 5,720,148 A | * | 2/1998 | Bedin et al. ................ 53/167 |
| 6,196,277 B1 | | 3/2001 | Till et al. |
| 6,230,763 B1 | | 5/2001 | Till |

(Continued)

FOREIGN PATENT DOCUMENTS

DE  10104207  10/2002

(Continued)

*Primary Examiner*—Gregory L Huson
*Assistant Examiner*—Jason K Niesz
(74) *Attorney, Agent, or Firm*—Greenblum & Bernstein, P.L.C.

(57) ABSTRACT

The invention relates to a method and a device for the preparation and bottling of liquids enriched with oxygen or with an oxygen/gas mixture. The method includes filling one or more containers with a gas enriched liquid; and sealing the containers pressure-tight, whereby the gas enriched liquid is kept under a nitrogen atmosphere at least part of the time during the bottling process. The process includes a filling device having one or more filling elements including a liquid valve, at least one gas valve, and a nitrogen-filled chamber; a flow connection for flushing and/or prepressurizing a container with nitrogen; and a sealing device configured to seal the containers pressure-tight using a closure. The instant abstract is neither intended to define the invention disclosed in this specification nor intended to limit the scope of the invention in any way.

22 Claims, 8 Drawing Sheets

U.S. PATENT DOCUMENTS

| | | | |
|---|---|---|---|
| 6,308,752 B1 * | 10/2001 | Tsukano et al. | 141/290 |
| 6,457,495 B1 * | 10/2002 | Meheen | 141/40 |
| 6,474,368 B2 * | 11/2002 | Clusserath et al. | 141/6 |
| 2002/0139434 A1 | 10/2002 | Meheen | |
| 2003/0232114 A1 * | 12/2003 | Dekleva | 426/312 |

FOREIGN PATENT DOCUMENTS

| | | |
|---|---|---|
| EP | 0847959 | 3/2002 |
| EP | 0900761 | 11/2003 |
| RU | 2181101 | 4/2002 |
| WO | 02/089611 | 11/2002 |

* cited by examiner

METHOD AND DEVICE FOR THE PRODUCTION AND BOTTLING OF LIQUIDS ENRICHED WITH OXYGEN

CROSS-REFERENCE TO RELATED APPLICATIONS

The present application is a U.S. National Stage of International Patent Application No. PCT/EP2004/010407 filed Sep. 16, 2004, and claims priority under 35 U.S.C. §119 of German Patent Application No. 103 43 281.7 filed Sep. 18, 2003. Moreover, the disclosure of International Patent Application No. PCT/EP2004/010407 is expressly incorporated by reference herein in its entirety.

BACKGROUND OF THE INVENTION

1. Field of the Invention

The invention relates to a method and a device for the preparation and bottling of liquids, in particular, to a method and a device for the preparation and bottling of liquids enriched with oxygen or with an oxygen/gas mixture.

2. Discussion of Background Information

Methods and devices for preparing highly oxygen-enriched liquids, in particular beverages, are known from the European patent EP 0 847 959 B 1 and the German published, unexamined application DE 101 04 207 A1.

In these methods, the oxygen-enriched liquid is kept in a pure oxygen atmosphere or an oxygen/gas mixture from impregnation until it is bottled in containers. Prior to introduction of the liquid into a container, the container is prepressurized with oxygen or an oxygen/gas mixture in a filling machine. It is necessary to accept a not inconsiderable loss of oxygen in the process as a whole. Not only is pure oxygen expensive, but its handling is not uncritical on account of its reactivity.

In contrast, an aspect of the invention is to disclose an improved method and a device for the preparation and bottling of oxygen-enriched liquids, as well as a beverage container obtainable therewith.

SUMMARY OF THE INVENTION

An aspect of the invention is attained with respect to the method characterized in that the enriched liquid is kept under a nitrogen atmosphere at least part of the time during the bottling process and the device characterized in that the device has at least one filling element with a liquid valve, at least one gas valve, and a nitrogen-filled chamber, wherein a flow connection for flushing and/or prepressurizing the container with nitrogen can be established between a container applied to the filling element and the chamber by way of the gas valve, and in that the device has a vat partially filled with liquid, and the liquid in the vat can be pressurized with nitrogen, preferably in the range from 1 to 10 bar.

While it hitherto seemed necessary, in order to prevent $O_2$ release, to keep liquids enriched with a very high $O_2$ content (75 mg/l to 330 mg/l), in particular beverages such as mineral water, soft drinks, fruit juices or the like, under an oxygen atmosphere or an oxygen/gas mixture from the time of $O_2$ enrichment to bottling in containers, such as bottles, cans, or other suitable vessels, the invention departs from this approach and utilizes the surprising finding that, on account of the only short dwell time of the liquid in the system during the ongoing preparation and filling process, there is likewise only a short contact time between the enriched liquid and the nitrogen used in accordance with the invention. Surprisingly, it has become apparent that there are no adverse effects on the $O_2$-enriched liquid when the containers to be filled are pre-pressurized with nitrogen, i.e., the dissolved $O_2$ content is not affected appreciably, and practically no nitrogen uptake by the liquid takes place. These effects may be attributed to the rather slow solution behavior of nitrogen.

According to an advantageous further development, the prepressurization of the container with nitrogen can also be preceded by a flushing treatment, likewise with nitrogen.

Alternatively or in addition, in the case of shape-retaining containers, e.g. glass bottles, at least one evacuation step prior to the introduction of the $O_2$ enriched liquid is possible before the prepressurization takes place to a fill pressure above atmospheric pressure, in particular the saturation pressure of the liquid. Furthermore, a combined multiple flushing/pre-evacuation treatment of a container prior to the prepressurization is possible.

Another embodiment of the invention provides for the insertion of a small quantity of a liquid gas, for example liquid nitrogen and/or oxygen, into the containers prior to the introduction of the liquid. With a subsequent brief evacuation, the liquid gas can be evaporated rapidly by way of a relatively fast pressure drop, by which it is likewise possible to produce a gas atmosphere, in particular of nitrogen. Liquid oxygen is less critical in its handling than pure oxygen in the gas phase. Of course, a prepressurization phase can again precede the introduction into the containers of the liquid to be bottled.

The use of nitrogen need not be restricted solely to the containers to be filled, but can also extend to the storage containers in the filling machine as well as in the liquid impregnation system (impregnation tank, storage tanks, etc.), i.e. the complete preparation process, starting from the impregnation of a liquid with oxygen to bottling in containers, can take place under a nitrogen atmosphere throughout.

Advantageously, nitrogen is not only less critical in its handling, but also significantly more economical than oxygen.

Other exemplary embodiments and advantages of the present invention may be ascertained by reviewing the present disclosure and the accompanying drawing.

DETAILED DESCRIPTION OF THE PRESENT INVENTION

Figure 1:
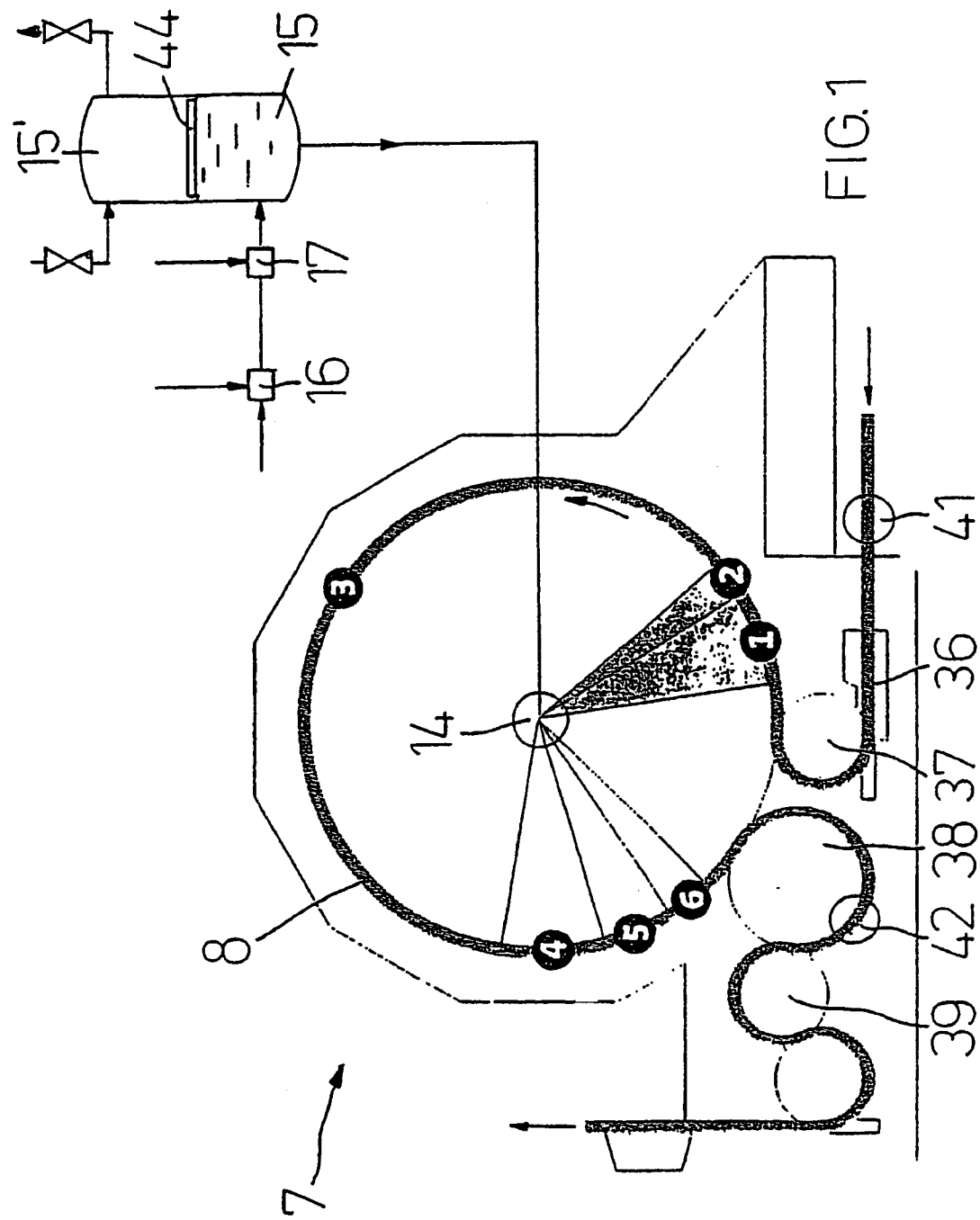
FIG. 1 illustrates a top view of a device for the preparation and filling of beverages into bottles in a diagrammatic representation.

As shown in FIG. 1, a system for preparing and bottling oxygen-enriched liquids, in particular beverages, has a filling machine 7 that can be continuously driven in rotation, which has for example an annular vat 8 partially filled with the beverage to be bottled and a gas chamber 10 filled with a cushion of pressurized gas above the beverage level 9, wherein the pressure corresponds at least to the saturation pressure of the beverage in question, preferably in the range of 1 to 10 bar. In the present case, the gas chamber is filled with nitrogen.

Distributed at regular intervals along the periphery of the annular vat, over its entire circumference, are filling elements 11, each of which is connected to the underside of the vat by a liquid supply line 12 passing through an inductive flow sensor. The filling machine's annular vat, which can be continuously driven in rotation, is supplied with the beverage to be bottled and the aforementioned pressurized gas (pure nitrogen) in a manner known per se through rotary manifolds 14 arranged in the center of the filling machine, which manifolds are flow-connected firstly to a gas supply line and secondly to a buffer tank 15 of an impregnating system for supplying liquid.

In a manner known per se, the impregnating system has, for enrichment with oxygen of a liquid, for example water, soft drink, tea, or the like, at least one injector 16, which has a connection for supplying the liquid and at least one additional connection for feeding oxygen. If needed, additional injectors 17, for example for dissolving $CO_2$, may also be present. If applicable, multiple parallel-connected injectors with different flow cross-sections can be provided in order to achieve optimal mixing ratios through selection of the appropriate injector(s) in the event of different flow rates.

The liquid supplied from the output side of the injector 16, 17 in use, containing a high proportion of dissolved oxygen, is directed into an impregnating or buffer tank 15, which is only partially filled with liquid and has a cushion of gas 15' enclosed in the container and acting on the liquid level; the gas cushion can be pressure-regulated in a controlled manner by way of a gas supply line and a gas exhaust line in the event of variations in the fill level. This pressurized gas (nitrogen) also has an overpressure which is above the saturation pressure of the liquid at least.

To feed the injectors and transfer the fully mixed beverage into the filling machine, controllable pumps—not shown— are provided.

Each of the filling elements 11 has a liquid valve 18 that can be actuated under electropneumatic control and through which a gas passage 19 extends concentrically. This gas passage, which transitions into a downward-projecting gas tube 20, stands in connection through a connecting line 21 with an outlet of a valve block 22 associated with the filling element 11; in the present case said valve block has, for each filling element, five separate gas valves 23 through 27 that can be actuated under electropneumatic control for sequence-dependent supply and exhaust of the individual process gases as a function of the filling process. However, one of the aforementioned valves 27 opens through a connecting line onto a gas feed located below the liquid valve 18.

All valve blocks 22, together with the liquid valves 18, are attached to an annular carrier 28, which in the present case has three annular channels 29, 30, 31, which are closed with respect to the ambient atmosphere and extend horizontally around the full circumference and likewise are connected by associated rotary manifolds in the center of the filling machine for the supply or exhaust of gas. Individually, these can be a pure gas channel 29, a flush gas channel 30, and a relief or vacuum channel 31.

Located in the region below the filling elements 11 are pneumatic lift cylinders 32 which can be raised and lowered under the control of a non-rotating cam 34 in conjunction with cam rollers 33, each of which lift cylinders has a gripping or holding element 35 that grips below the collar of plastic bottles 40. A gas cushion enclosed in the lift cylinder continuously exerts a contact pressure directed upward toward the filling element 11 throughout a complete cycle.

A complete filling cycle for a bottle is explained below using the sequence of FIGS. 2a through 2g depicting the individual filling phases.

Figure 2A:
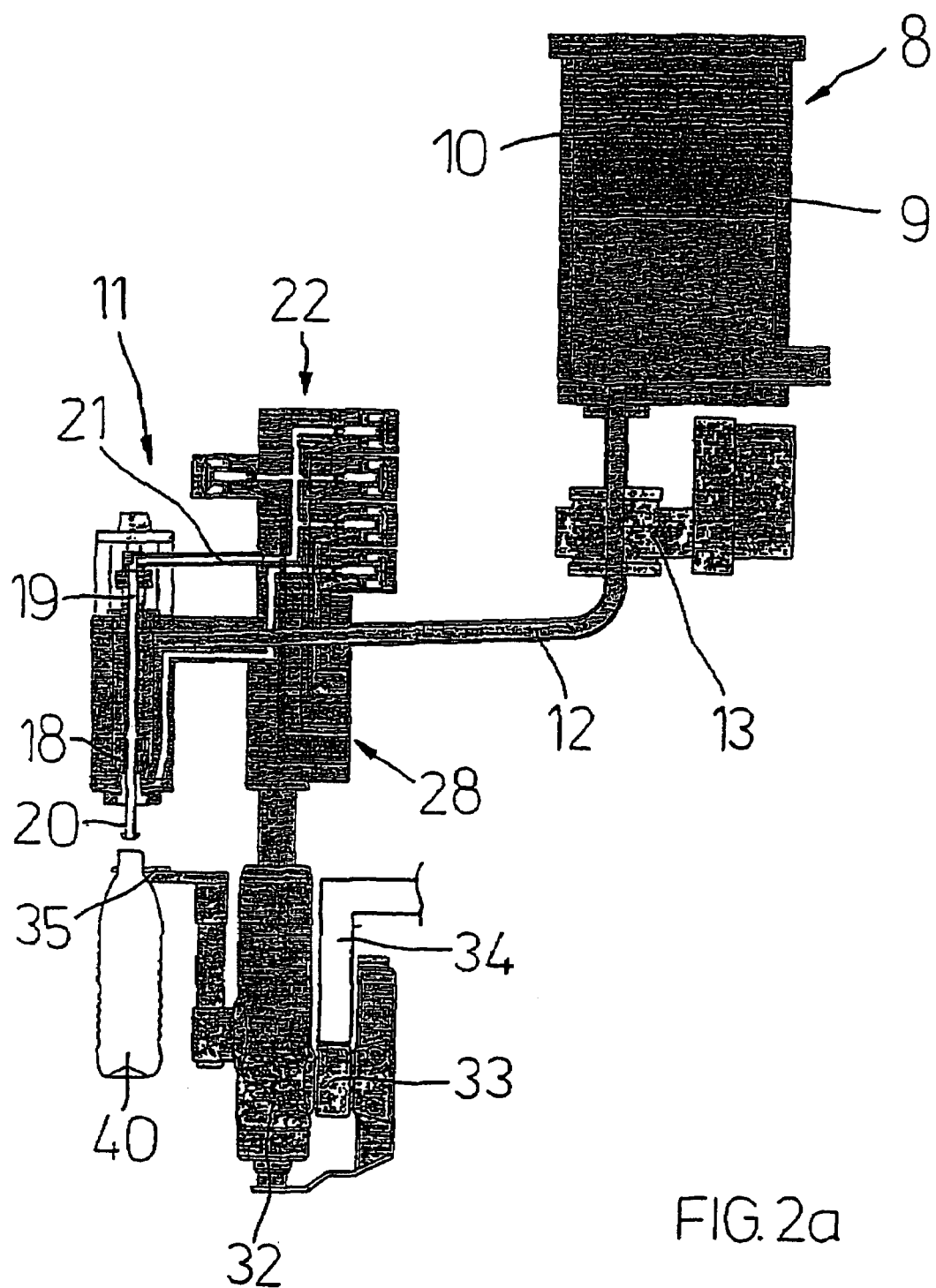
FIGS. 2a to 2g illustrate partial vertical cross-sections through the outer periphery of a filling machine from FIG. 1 in multiple chronologically sequential operating states.

A continuous single row of bottles arriving from, for example, a stretch blow molding machine (not shown) producing plastic bottles 40 is drawn apart to the pitch of the filling elements on the circumference of the filling machine by a separating screw 36 arranged in an infeed section of the filling machine 7, and is transferred into the lift cylinders 32 by a subsequent star wheel infeed 37. During this process, one bottle 40 at a time is gripped beneath its collar such that its open mouth is held concentrically aligned with the liquid outlet of the filling element 11 positioned above it (FIG. 2a).

Figure 2B:
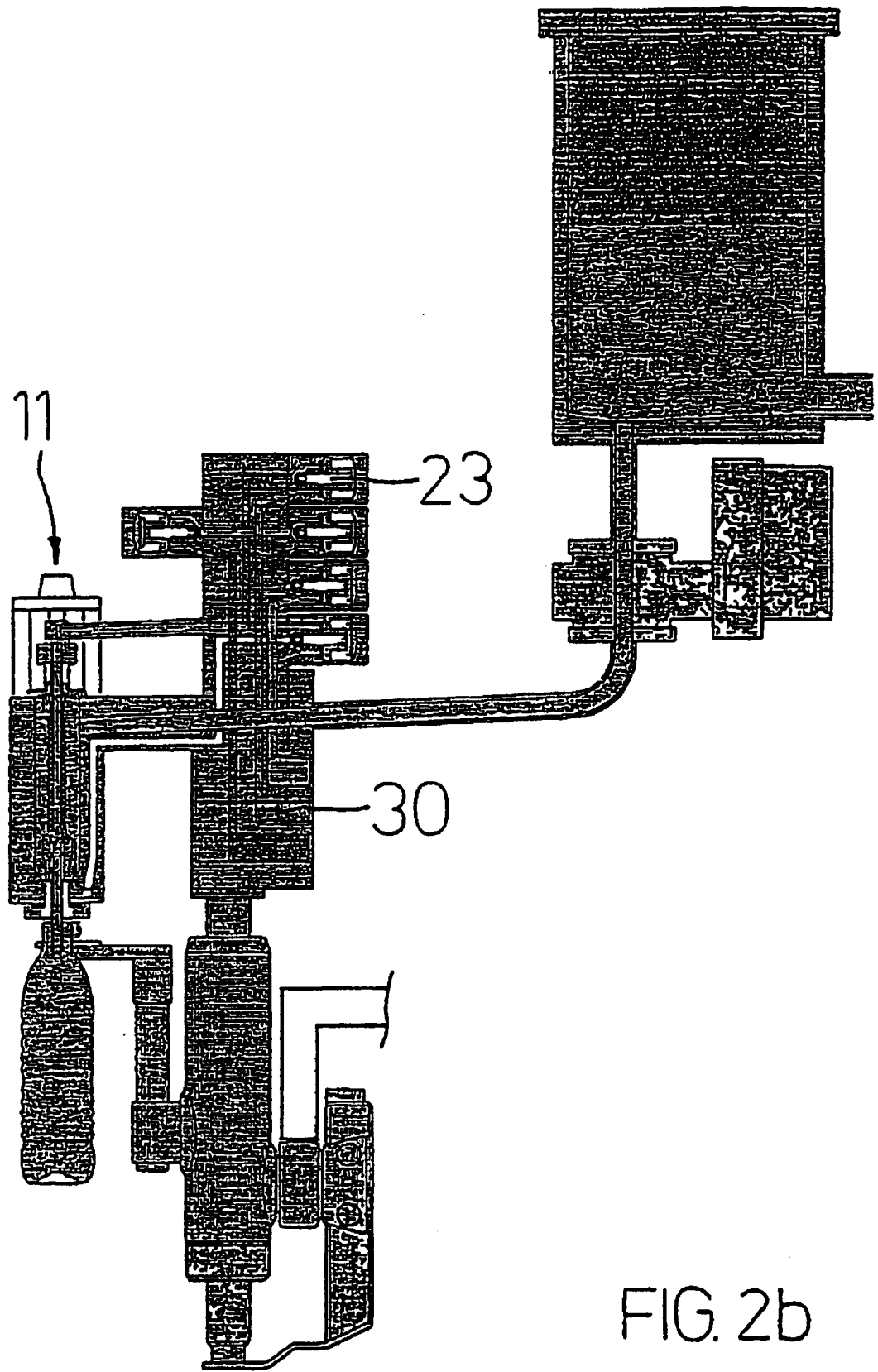

The stationary cam 34 that works together with the cam roller 32 of the lift cylinder 32 is designed in the circumferential direction such that the mouth of the bottle 40 is initially raised toward the liquid outlet but has not yet reached a gas-tight pressed-on seal with the filling element 11. During this process, the gas tube 20 projecting downward beyond the liquid outlet enters the neck of the bottle 40 to be filled (FIG. 2b). The opening of a flush valve 23 opens a gas connection from the flush gas channel 30 through the connecting line 21 and the gas tube 20 extending into the bottle, so that a flush gas, in the present case made essentially of nitrogen, flows into the as-yet unsealed bottle at high velocity and drives the air originally contained out through the open bottle mouth. This takes place in the area of rotation of the filling machine labeled position 1 in FIG. 1.

Figure 2C:
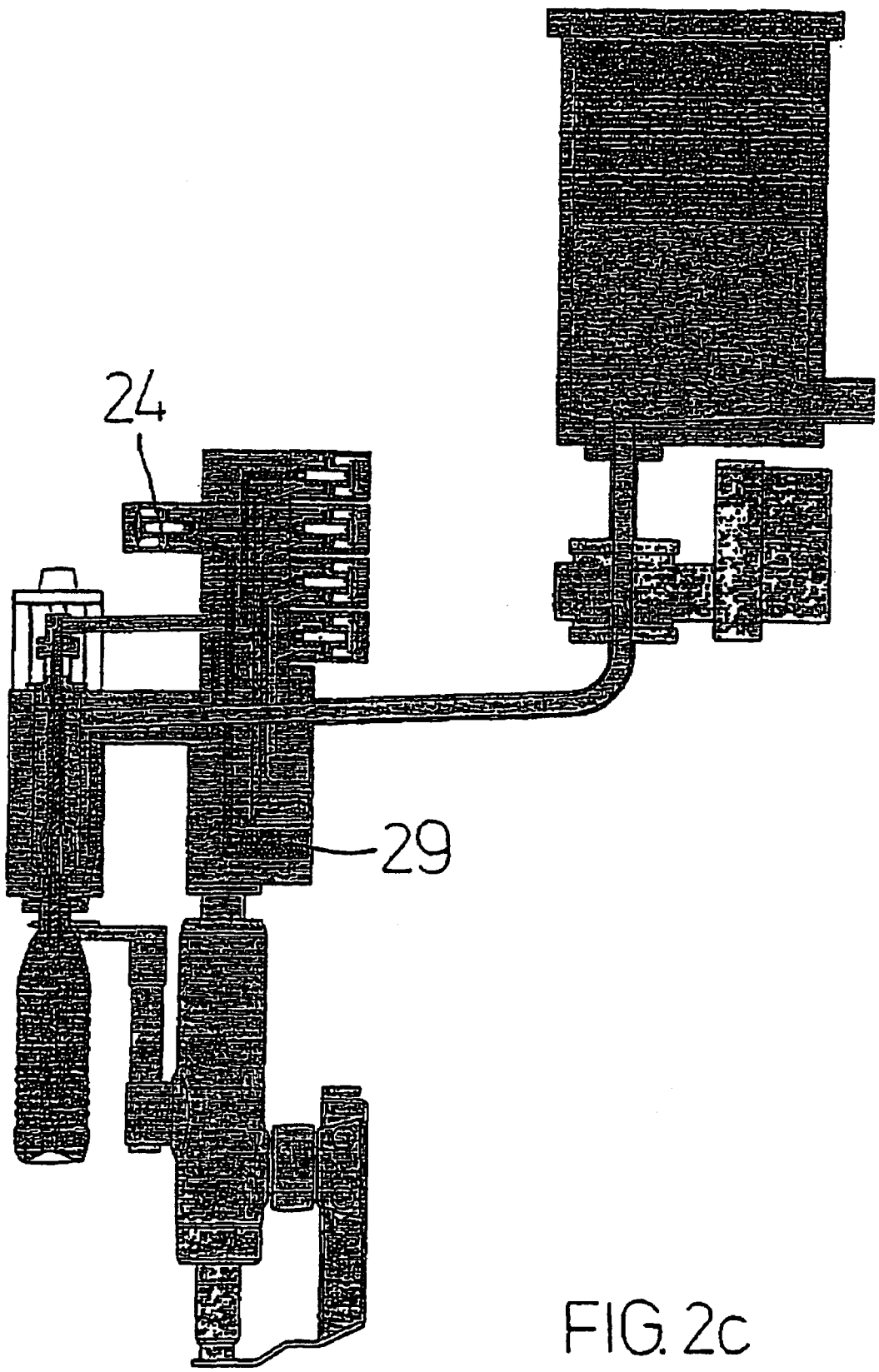

Subsequent raising of the bottle 40 by way of the lift cylinder 32 causes the mouth of the bottle to be pressed gas-tight against the fill outlet of the filling element 11 below the liquid valve 18, whereupon after the closure of the flush valve 23 a prepressurization valve 24 is opened in order to open a flow connection between the gas tube 20 and the pure-gas channel 29 (FIG. 2c). Pure nitrogen can now be introduced from the pure-gas channel 29 into the bottle, which is kept sealed with respect to the atmosphere until a predefinable prepressurization pressure, preferably 1 to 10 bar, is reached, which corresponds essentially to the gas pressure prevailing in the annular vat of the filling machine (area of rotation 2 in FIG. 1). The equalization of pressure present between the two aforementioned volumes can be ensured by way of a connecting line that is not shown, for example. The gas cushion 10 present within the annular vat 8 of the filling machine 7 can also be made of pure nitrogen. The interior vat pressure, which is above the saturation pressure of an $O_2$-enriched beverage, depends in the individual case on the degree of enrichment of the beverage to be processed and on its temperature, and accordingly is adjustable.

Figure 2D:
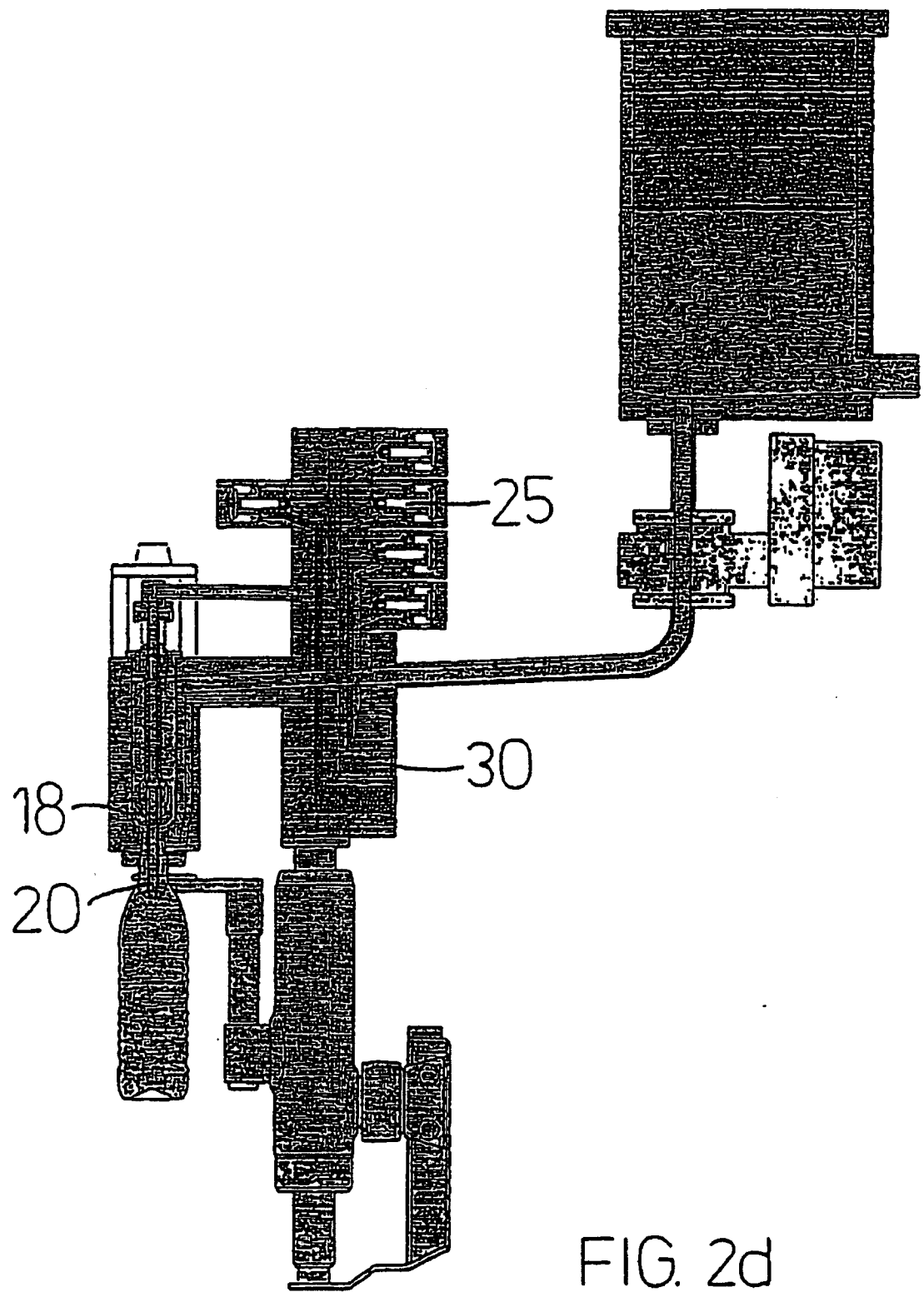
Figure 2E:
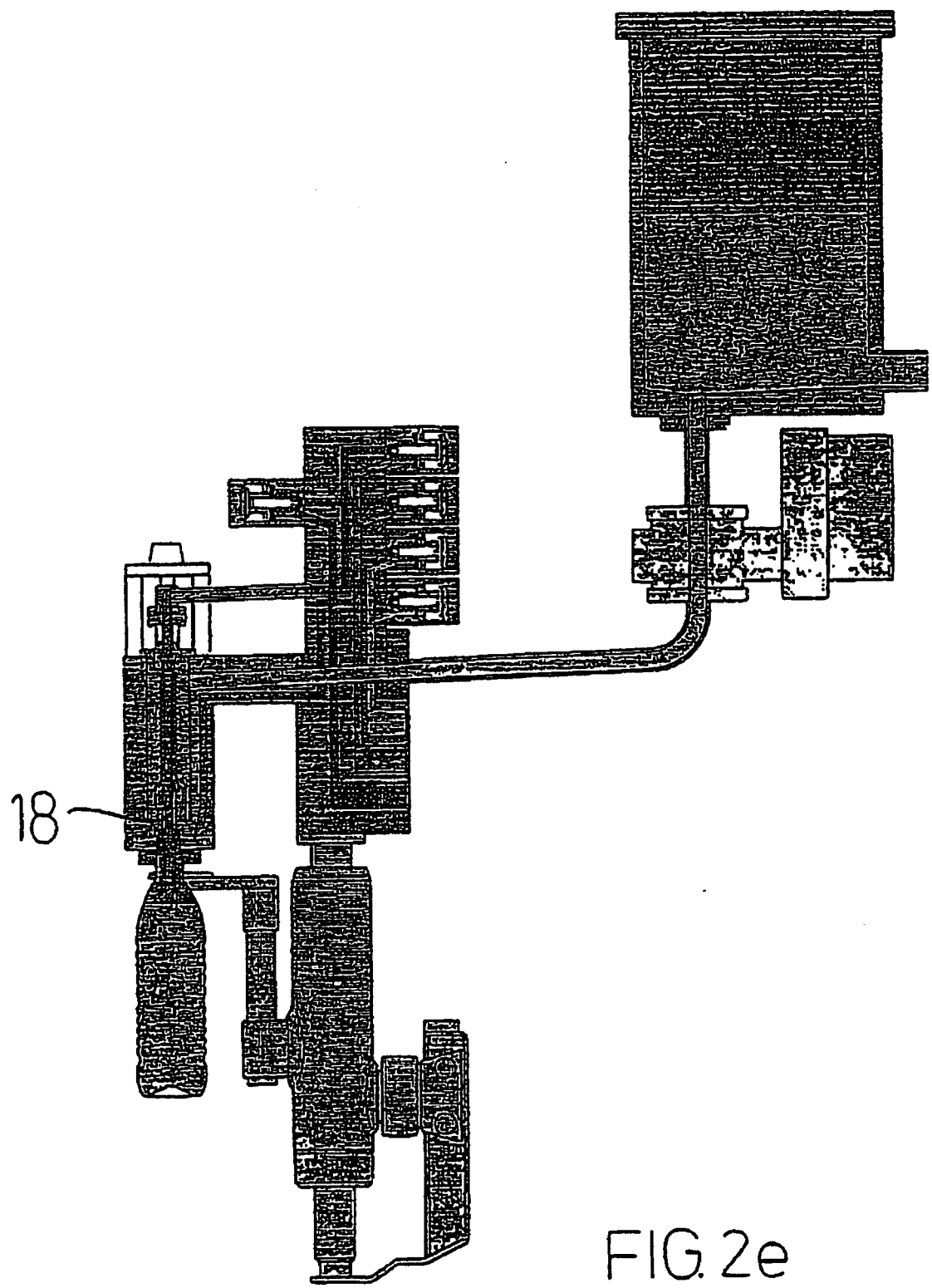
Figure 2F:
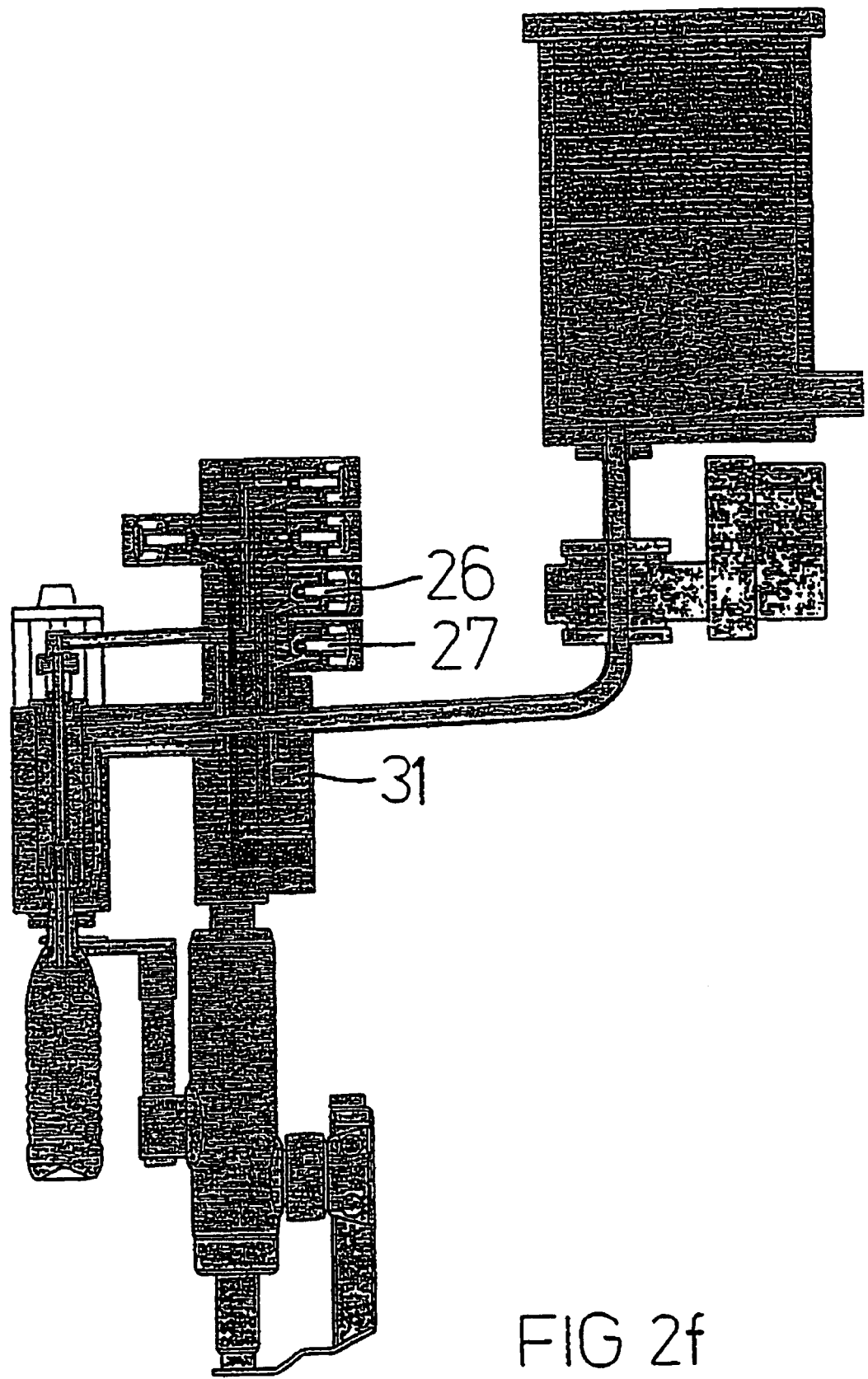
Figure 2G:
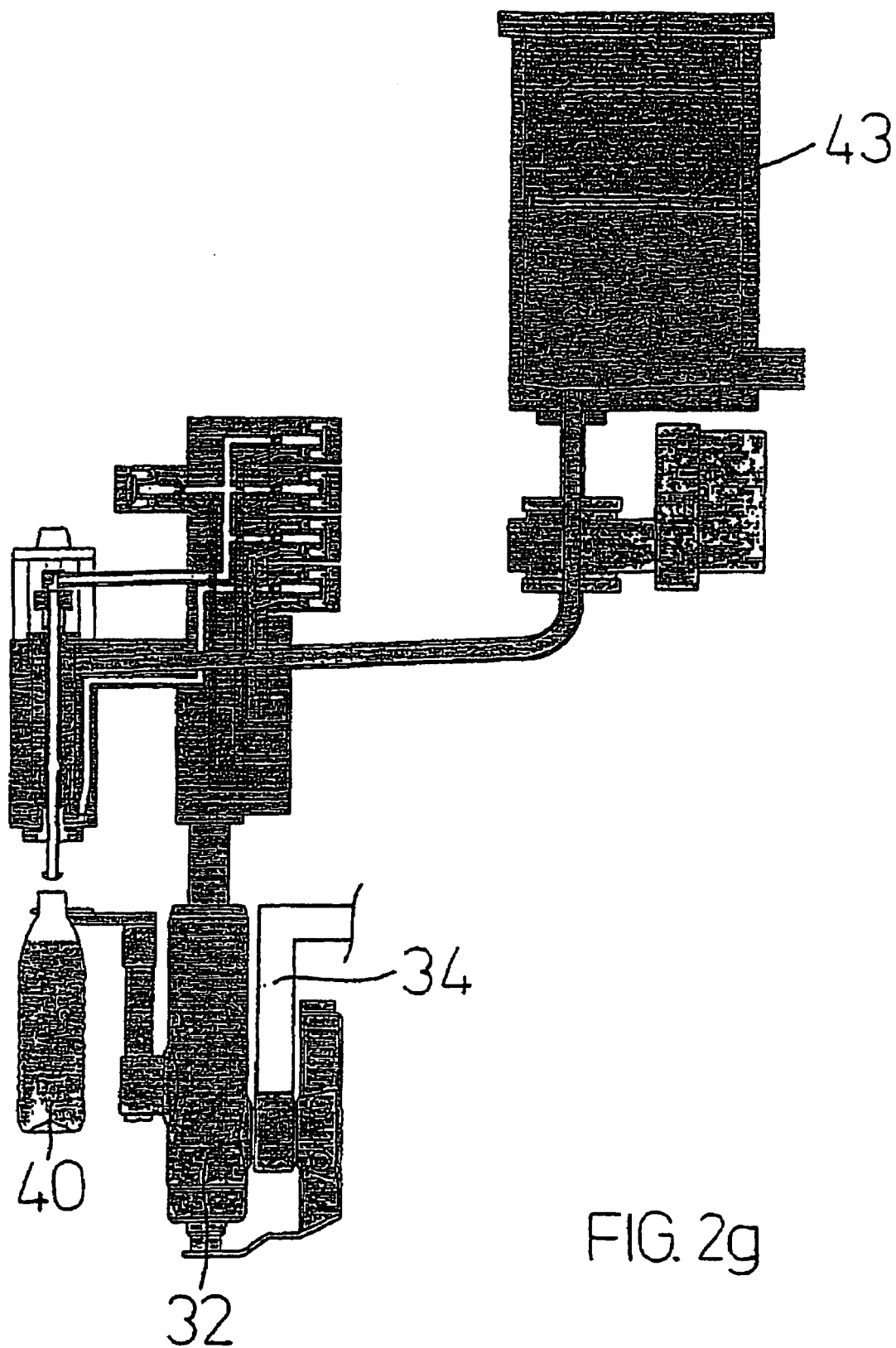

Upon reaching the desired prepressurization pressure in the bottle, the liquid valve 18 is now opened by raising its movable valve body from the associated valve seat, the prepressurization valve 24 is closed, and a return gas valve 25 is actuated. As the process continues, the beverage now flows through the bottle mouth into the bottle interior, and is directed to the bottle wall by a deflector located on the gas tube 20 in the region of the expanding bottle shoulder in order to flow from there along the bottle wall toward the bottle bottom in the form of a liquid film (FIG. 2d). Meanwhile, the quantity of beverage flowing in is continuously measured by the inductive flow sensor 13. The sensor supplies a signal to close the liquid valve 18 when a predefinable quantity of liquid is reached. While the liquid flows into the bottle, the gas volume originally contained in the bottle simultaneously flows back through the gas tube 20 past the return gas valve 25, which is open during this phase, into the flush gas channel (area of rotation 3 in FIG. 1) as a result of the incoming liquid. This return gas valve 25 is also closed approximately simultaneously with the closing of the liquid valve 18 (FIG. 2e). After a predefinable settling time (area of rotation 4 in FIG. 1), the headspace of the filled bottle, which is still at an overpressure, is connected to the relief channel 31 by opening at least one relief valve 26 in order to bring about a pressure drop, for example through an interposed throttling port, to an intermediate pressure or directly to atmospheric pressure (areas of rotation 5 and 6 in FIG. 1). The gas tube 20 can simultaneously be relieved through a second relief valve 27 (see FIG. 2*f*). It is alternatively possible, however, to establish an underpressure in the relief channel when an appropriately narrower throttling port is interposed.

After the relieving, the bottle 40 is lowered by the appropriately designed stationary cam 34 against the upward-acting contact pressure applied by the lift cylinder 32 (FIG. 2*g*), and is subsequently transferred into the star wheel outfeed 38 of the filling machine 7, whereupon the gripping elements 35 of the lift cylinder 32 holding the bottle are simultaneously opened. The filled but still open bottle can now be delivered to a sealing machine 39, which applies a screw closure in a gas-tight manner, for example.

It is possible to inject liquid nitrogen and/or oxygen into the open headspace of the bottles in a pulsed, controlled manner on the path from the filler 7 to the sealing machine 39, by way of a controllable injection device 42 located in this transport region, before a closure is applied.

The injection of liquid nitrogen and/or oxygen by an injection device 41 in the region ahead of the infeed of the filling machine 7 is also possible, primarily when a vacuum is briefly generated prior to the introduction of the liquid to be bottled, in that the vacuum present in the relief channel is temporarily brought into operative connection with the bottle. It is a matter of course that in this case the bottles must have adequate shape stability as a function of the desired underpressure, such as is of course the case with glass bottles, for example.

In order to reliably avoid a gas exchange between the nitrogen atmosphere and the beverage below it in the annular vat 8 of the filling machine 7, or even in the buffer tank or collecting tank 15 of the beverage impregnating station, a flat, ring-shaped float 43 can additionally be used in the annular vat 8, covering essentially the full area of the surface of the beverage volume present in the annular vat. Floats 44 covering the liquid level can also be used for the same purpose in the tank 15 containing the oxygenated beverage of the impregnating station located ahead of the filler. In place of floats, elastic membranes, balloons or rolled membranes are also possible, by which it would even be possible to achieve a gap-free and thus complete separation of pressurized gas and beverage.

As an alternative to the proposed nitrogen, noble gases (helium, etc.) could also be used if desired, although they are more expensive to procure.

The invention claimed is:

1. A method for the preparation and bottling of liquids comprising:
    enriching a liquid with at least one of oxygen and an oxygen/gas mixture to produce a gas enriched liquid;
    filling one or more containers with the gas enriched liquid; and
    sealing the containers pressure-tight,
    wherein the gas enriched liquid is kept under the nitrogen atmosphere for at least part of the time after the liquid is enriched, and
    wherein the gas enriched liquid is kept under the nitrogen atmosphere from the time of gas enrichment until a desired fill height in the container is reached.

2. The method for the preparation and bottling of liquids according to claim 1, wherein the nitrogen atmosphere is overpressurized, preferably in the range between 1 and 10 bar.

3. The method for the preparation and bottling of liquids according to claim 1, further comprising prepressurizing a container with nitrogen prior to the filling of the container with gas enriched liquid, wherein the container prepressure corresponds to the fill pressure of the gas enriched liquid.

4. The method for the preparation and bottling of liquids according to claim 1, further comprising flushing a container one or more times with nitrogen prior to the filling of the container with the gas enriched liquid.

5. The method for the preparation and bottling of liquids according to claim 3, wherein, prior to prepressurizing with nitrogen, the method further comprising evacuating the container one or more times prior to filling the container with gas enriched liquid, whereby the container is evacuated prior to being prepressurized with nitrogen.

6. The method for the preparation and bottling of liquids of claim 4, further comprising prepressurinzing the container at least one of before and after the flushing with nitrogen.

7. The method for the preparation and bottling of liquids according to claim 1, wherein when the gas enriched liquid is introduced into the container, the return gas is collected and used for flushing one or more subsequent containers.

8. The method for the preparation and bottling of liquids according to claim 1, further comprising introducing a liquid gas into the container prior to the filling of the container with gas enriched liquid.

9. The method for the preparation and bottling of liquids of claim 8, wherein the liquid gas is at least one of nitrogen and oxygen.

10. The method for the preparation and bottling of liquids of claim 8, wherein the liquid gas enters the container before the container is evacuated.

11. The method for the preparation and bottling of liquids of claim 1, wherein the container may be a bottle or a can.

12. An apparatus for the preparation and bottling of liquids comprising:
    at least one filling element having a liquid valve;
    at least one gas valve;
    a nitrogen-filled chamber;
    a flow connection for flushing and/or prepressurizing a container with nitrogen being located between the at least one filling element and the nitrogen filled chamber through the at least one gas valve; and
    a vat at least partially filled with a liquid pressured with nitrogen, said liquid being a gas enriched liquid which is enriched with at least one of oxygen and an oxygen/gas mixture,
    wherein the apparatus is configured to maintain the gas enriched liquid under a nitrogen atmosphere from a time of gas enrichment until a desired fill height in the container is reached.

13. The apparatus for the preparation and bottling of liquids of claim 12, wherein the filling element is connected to at least one of a flush gas channel via a flush valve, and a pure gas channel via a prepressurization valve.

14. The apparatus for the preparation and bottling of liquids of claim 12, wherein the filling element is connected to at least one of a relief channel and a vacuum channel via one or more relief valves.

15. The apparatus for the preparation and bottling of liquids of claim 12, wherein a gas enriched liquid enters a partially filled tank pressurizable with nitrogen.

16. The apparatus for the preparation and bottling of liquids of claim 15, wherein the liquid in the vat is pressured with nitrogen in a range of 1 to 10 bar.

17. The apparatus for the preparation and bottling of liquids of claim 15, wherein the liquid in at least one of the vat and tank is separated from the pressure-exerting gas.

18. The apparatus for the preparation and bottling of liquids of claim 17, wherein movable floats or elastic membranes are used to separate the pressure-exerting gas.

19. The apparatus for the preparation and bottling of liquids of claim 12, wherein a device for introducing a liquid gas into an open container is operable before a filling device fills the open container with a gas enriched liquid.

20. The apparatus for the preparation and bottling of liquids of claim 12, wherein the container includes a gas enriched liquid that is enriched with oxygen, an oxygen/gas mixture, or other applicable gas.

21. The apparatus for the preparation and bottling of liquids according to claim 12, wherein the gas enriching the liquid may be in dissolved form.

22. The apparatus for the preparation and bottling of liquids of claim 12, wherein the container may be a bottle or a can.

* * * * *

UNITED STATES PATENT AND TRADEMARK OFFICE
CERTIFICATE OF CORRECTION

PATENT NO. : 7,721,773 B2  Page 1 of 1
APPLICATION NO. : 10/572356
DATED : May 25, 2010
INVENTOR(S) : Thomas Stadlmayr et al.

It is certified that error appears in the above-identified patent and that said Letters Patent is hereby corrected as shown below:

On the cover page of the printed patent, at Item (73), Assignees,
Adelholzener Alpenquellen GmbH, Siegsdorf (DE); Krones Aktiengesellschaft, Neutraubling (DE) should be -- Krones Aktiengesellschaft, Neutraubling (DE) --.

Signed and Sealed this

Third Day of August, 2010

David J. Kappos
*Director of the United States Patent and Trademark Office*